United States Patent
Iwasaki et al.

(10) Patent No.: US 10,762,039 B2
(45) Date of Patent: Sep. 1, 2020

(54) BACKUP AND RESTORATION FOR STORAGE SYSTEM

(71) Applicant: International Business Machines Corporation, Armonk, NY (US)

(72) Inventors: Norie Iwasaki, Fujisawa (JP); Sosuke Matsui, Tokyo (JP); Tsuyoshi Miyamura, Yokohama (JP); Terue Watanabe, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/797,116

(22) Filed: Oct. 30, 2017

(65) Prior Publication Data

US 2018/0046633 A1    Feb. 15, 2018

Related U.S. Application Data

(62) Division of application No. 14/828,604, filed on Aug. 18, 2015, now Pat. No. 9,858,278.

(30) Foreign Application Priority Data

Aug. 29, 2014    (JP) .................................. 2014-175715

(51) Int. Cl.
*G06F 16/00* (2019.01)
*G06F 16/11* (2019.01)
(Continued)

(52) U.S. Cl.
CPC .......... *G06F 16/119* (2019.01); *G06F 16/122* (2019.01); *G06F 16/1873* (2019.01); *G06F 16/2228* (2019.01); *G06F 16/27* (2019.01)

(58) Field of Classification Search
CPC ......... G06F 17/30079; G06F 17/30575; G06F 11/1451; G06F 11/1469
See application file for complete search history.

(56) References Cited

U.S. PATENT DOCUMENTS 8,126,847 B1    2/2012 Zheng et al.
9,659,021 B1    5/2017 Dobrean et al.
(Continued)

FOREIGN PATENT DOCUMENTS

JP    2005165486 A    6/2005
JP    2010522914 A    7/2010
(Continued)

OTHER PUBLICATIONS

"Backup Method, Restoration Method, Storage System, and Program", Japan patent application 2014-175715, (English Translation), pp. 1-65, filed Aug. 29, 2014.
(Continued)

*Primary Examiner* — Augustine K. Obisesan
(74) *Attorney, Agent, or Firm* — Robert J. Shatto

(57) ABSTRACT

A backup method is provided for a file system for managing hierarchical storage including one or more storage media on a computer system including one or more computers. Each of the one or more storage media includes a data part which is separated from an index and on which updated information is appended and kept. Each of a plurality of pieces of data within the file system is managed to be migrated to at least any of the one or more storage media. The backup method includes backing up metadata of the plurality of pieces of data migrated within the file system; and backing up the index of each of the one or more storage media to which the plurality of pieces of data have been migrated, substantially at the same time point as the metadata.

20 Claims, 15 Drawing Sheets

(51) Int. Cl.
    *G06F 16/27*     (2019.01)
    *G06F 16/18*     (2019.01)
    *G06F 16/22*     (2019.01)

(56) References Cited

U.S. PATENT DOCUMENTS

| | | | |
|---|---|---|---|
| 9,858,278 B2 | 1/2018 | Iwasaki et al. | |
| 2005/0187992 A1 | 8/2005 | Prahlad | |
| 2009/0089340 A1* | 4/2009 | Ohr | G06F 11/1458 |
| 2009/0198790 A1* | 8/2009 | Grevers, Jr. | H04L 67/2842 |
| | | | 709/213 |
| 2009/0319532 A1 | 12/2009 | Akelbein | |
| 2010/0257437 A1* | 10/2010 | Hwang | G06F 11/1458 |
| | | | 714/819 |
| 2011/0078118 A1 | 3/2011 | Kushwah | |
| 2011/0125714 A1* | 5/2011 | Manson | G06F 11/1458 |
| | | | 707/645 |
| 2011/0218966 A1 | 9/2011 | Barnes et al. | |
| 2012/0079223 A1* | 3/2012 | Jaquette | G06F 11/2094 |
| | | | 711/162 |
| 2012/0311282 A1* | 12/2012 | Cannon | G06F 16/119 |
| | | | 711/162 |
| 2012/0323934 A1* | 12/2012 | Amir | G11B 27/032 |
| | | | 707/752 |
| 2013/0275541 A1 | 10/2013 | Wang et al. | |
| 2014/0074790 A1 | 3/2014 | Berman | |
| 2014/0201154 A1* | 7/2014 | Varadharajan | G06F 11/1451 |
| | | | 707/647 |
| 2014/0201161 A1 | 7/2014 | Kumarasamy et al. | |
| 2014/0250082 A1 | 9/2014 | Paksoy et al. | |
| 2014/0258236 A1 | 9/2014 | Vijayan | |
| 2016/0063007 A1 | 3/2016 | Iwasaki et al. | |
| 2018/0046632 A1 | 2/2018 | Iwasaki et al. | |
| 2018/0046633 A1 | 2/2018 | Iwasaki et al. | |
| 2018/0046634 A1 | 2/2018 | Iwasaki et al. | |

FOREIGN PATENT DOCUMENTS

| | | |
|---|---|---|
| JP | 2012065087 A | 3/2012 |
| JP | 2012243339 A | 12/2012 |
| JP | 2013101506 A | 5/2013 |
| JP | 2013254513 A | 12/2013 |

OTHER PUBLICATIONS

Decision to Grant, Japan Patent Application No. 2014-175715, dated Jun. 14, 2016, 3 pgs.

List of IBM Patents or Patent Applications Treated as Related, Oct. 26, 2017, 2 pgs.

Iwasaki et al., "Backup and Restoration for Storage System," U.S. Appl. No. 15/797,096, filed Oct. 30, 2017.

Iwasaki et al., "Backup and Restoration for Storage System," U.S. Appl. No. 15/797,152, filed Oct. 30, 2017.

Iwasaki et al., "Backup and Restoration for Storage System," U.S. Appl. No. 16/522,855, filed Jul. 26, 2019.

List of IBM Patents or Patent Applications Treated as Related, Jul. 25, 2019, 2 pgs.

* cited by examiner

BACKUP AND RESTORATION FOR STORAGE SYSTEM

TECHNICAL FIELD

The present invention relates to backup and restoration of a file system, and more particularly to a backup method, a restoration method, a storage system, and a program for a file system for hierarchical storage.

BACKGROUND

Backups of data and keeping thereof are essential to deal with data missing due to a disaster and the like. In an actual disaster, the backup data will be utilized to perform restoration. In recent years, however, since an amount of data to be handled, as referred to as "big data," has tended to increase and also led to a huge amount of backup data, the time required for the restoration has tended to be prolonged. As a backup technology for the purpose of quick recovery of such a file system, for example, JP2013-254513A, has been known.

In addition, tape media are often used as inexpensive backup media. Commonly, in operation, the backup data is saved on tapes while the data is retained on a disk. In a disaster, a method is employed in which all the backup data is read out from the tapes and recovered in a state accessible from the disk. In such a scheme, however, since work cannot be resumed until the data is read out from all the tapes, the recovery takes a very long time.

SUMMARY

Embodiments of the present invention provide a backup method for a file system having the following characteristics. This file system is configured on a computer system including one or more computers, and manages hierarchical storage including one or more storage media. Each of the above one or more storage media includes a data part which is separated from an index and on which updated information is appended and kept. Each of a plurality of pieces of data within the above file system is managed to be migrated to at least any of the above one or more storage media.

In one embodiment, the backup method includes, in the computer system, the operations of backing up metadata of the above plurality of pieces of data migrated within the file system; and backing up the index of each of the one or more storage media to which the above plurality of pieces of data have been migrated, substantially at the same time point as the above metadata. Backup data of the metadata and the index, which has been obtained, is used in restoration along with the above one or more storage media.

Embodiments of the present invention can further provide a restoration method for a file system for managing hierarchical storage on a computer system including one or more computers, and the method has the following characteristics. In this restoration method, one or more storage media on which backups of metadata and an index have been performed are prepared. This restoration method includes, in the computer system, the operations of restoring metadata of a plurality of pieces of data within the file system from backup data, and setting, in the restored metadata, the plurality of pieces of data into a state of having been fully migrated to at least any of the one or more storage media; and restoring the index of each of the above one or more storage media from data backed up substantially at the same time point as the metadata.

Embodiments of the present invention can further provide a storage system having the following characteristics. This storage system can include one or more storage drive devices for loading at least one of one or more storage media constituting hierarchical storage; one or more computers for causing a file system to run, the file system managing the above hierarchical storage; and a management computer included in the above one or more computers or provided separately from the above one or more computers.

The management computer can control metadata of a plurality of pieces of data migrated within the file system to be backed up, and also control an index of each of the one or more storage media to which the plurality of pieces of data have been migrated, to be backed up substantially at the same time point. Alternatively, the management computer can control the metadata of the plurality of pieces of data within the file system to be restored from backup data, also control the index of each of the one or more storage media to be restored from data backed up substantially at the same time point as the above metadata, and set, in the above metadata, the above plurality of pieces of data into a fully-migrated state. Embodiments of the present invention can further provide a program for implementing a management computer for executing the above backup or restoration.

DETAILED DESCRIPTION

Embodiments of the present invention provide a backup method, a restoration method, a storage system, and a program. Some embodiments of the present invention can achieve one or more of: shortened recovery time, an operational file system even after the backup, a small load on the system, and increased usage efficiency of storage media that are migration destinations. Embodiments of the present invention recognize that time required for the restoration greatly affects time of resumption of business, and thus is desired to be shortened as much as possible.

Embodiments of the present invention recognize that, in the backup and the restoration of the file system, it is desirable to shorten recovery time, and also enable operation of the file system even after the backup. Moreover, it is also desired to reduce a load on the system, and increase utilization efficiency of storage media that become migration destinations. Accordingly, development of backup and restoration technologies for a file system for hierarchical storage has been desired, which can achieve shortened recovery time, an operational file system even after the backup, a small load on the system, and increased usage efficiency of the storage media that become the migration destinations.

Embodiments of the present invention may have several advantageous effects. According to the above configuration, it is possible to achieve the shortened recovery time, the operational file system even after the backup, the small load on the system, and the increased usage efficiency of the storage media that become the migration destinations.

While embodiments of the present invention will be described below, the embodiments of the present invention are not limited to that described below. It should be noted that, in the described embodiment, a hierarchical storage management system 100 will be described as an example of a storage system that implements backup and restoration of a file system for managing hierarchical storage.

Figure 1:
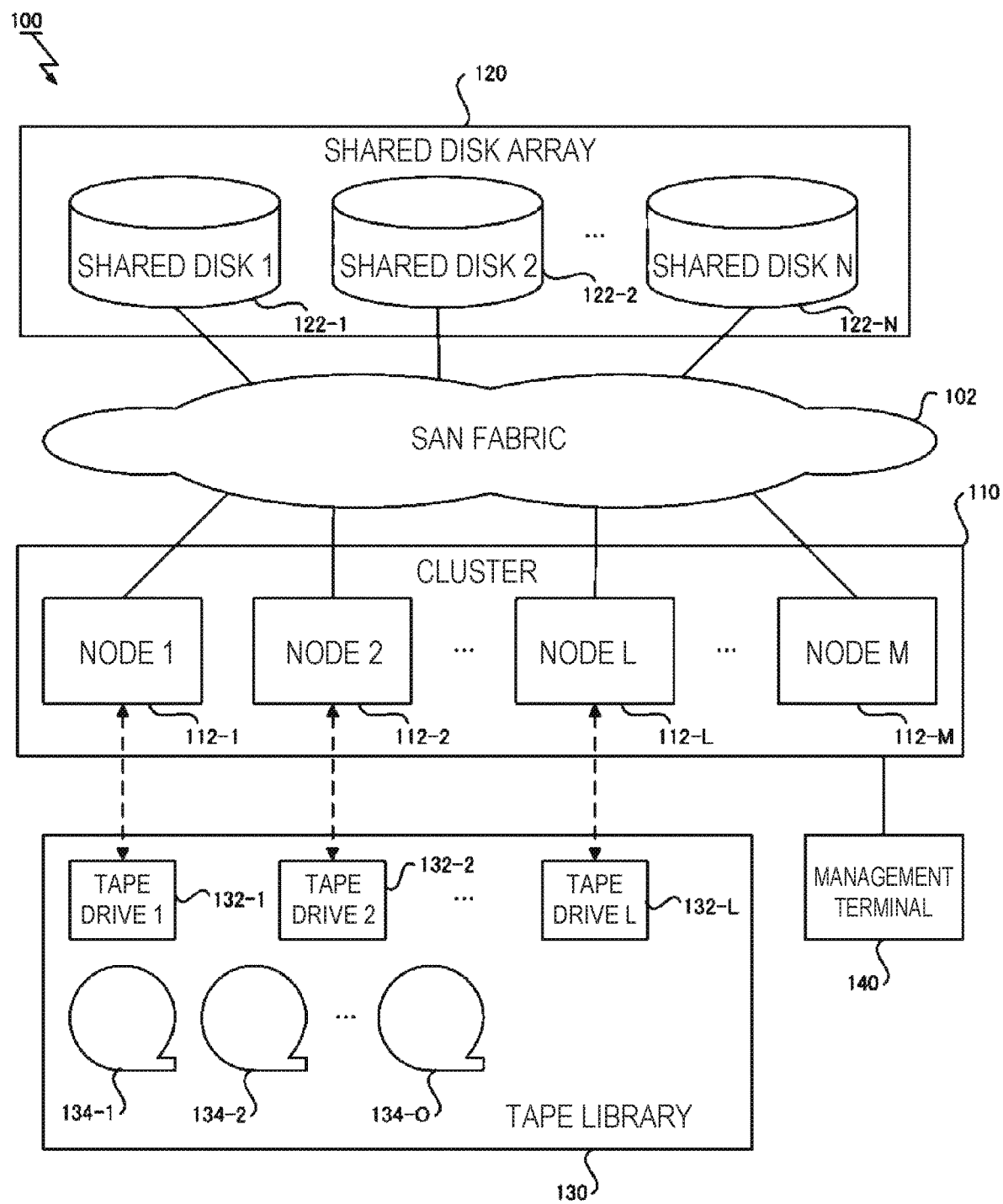
FIG. 1 is a schematic configuration diagram of a hierarchical storage management system, in accordance with embodiments of the present invention.

FIG. 1 is a diagram illustrating a schematic configuration of the hierarchical storage management system 100, in accordance with embodiments of the present invention. The hierarchical storage management system 100 illustrated in FIG. 1 includes a cluster 110 composed of one or more nodes 112, and implements the file system for managing the hierarchical storage, on the cluster 110.

In the embodiment illustrated in FIG. 1, the hierarchical storage is configured to include a shared disk array 120 including one or more shared disks 122. Each of the nodes 112 in the cluster 110 is interconnected to each of the shared disks 122 in the shared disk array 120 via a SAN (Storage Area Network) fabric 102. The SAN fabric 102 can be configured with, but not particularly limited to, an FC-SAN based on a Fibre Channel network configured to include a Fibre Channel switch, an IP-SAN based on a TCP/IP network configured to include a LAN (Local Area Network) switch, or a combination thereof.

A plurality of the nodes 112 share each of the shared disks 122. The nodes 112 directly access the shared disks 122 via the SAN fabric 102, and also provide indirect file access to other client nodes that are not connected to the SAN fabric 102. Such a file system, which is distributed into the one or more nodes 112 constituting the cluster 110, and is accessible from a plurality of nodes (including the client nodes), is referred to as "distributed shared (parallel) file system." The distributed shared file system can provide a global name space, and also provide an input/output striping function, an information life-cycle management (ILM) function, and the like, across the plurality of nodes.

GPFS® is assumed to be used as the distributed shared file system in the described embodiment, which, however, is not particularly limited thereto, and employment of other distributed shared (parallel) file systems, such as GFS (Global File System), OCFS (Oracle® Cluster File System), Lustre, and GlusterFS, is not precluded.

In the embodiment illustrated in FIG. 1, the hierarchical storage is further configured to include a tape library 130, in addition to the shared disk array 120. The tape library 130 includes one or more tape drives 132, and one or more tape media 134. The tape drives 132 constitute storage drive devices in the present embodiment, and the tape media 134 constitute storage media that become migration destinations in the present embodiment. Each of the nodes 112 in the cluster 110 is connected to the tape library 130 via the SAN fabric, or via cables, such as FC, LVD (Low Voltage Differential), SCSI (Small Computer System Interface), and SAS (Serial Attached SCSI).

The tape library 130 can include a plurality of the tape drives 132, and is configured so that the one or more nodes 112 can access the same set of the tape media 134. Meanwhile, while the tape drives 132 can also be alternately used, each of the tape drives 132 is typically occupied by one node at a time point, and is not shared among the nodes 112, so that each of the nodes 112 accessing the tape library 130 has its own tape drive 132.

The tape library 130 is managed by a file system for a tape library, such as LTFS (Liner Tape File System), but is integrated into the distributed shared file system described above. According to a predetermined policy, files to be migrated from the shared disk array 120 are stored in the one or more tape media 134. The integration of the file system for the tape library 130 into the distributed shared file system can be performed by use of, but not particularly limited to, a package such as LTFS EE (Linear Tape File System Enterprise Edition). The tape media 134 can preferably use, but not particularly limited to, tape cartridges of LTO (Linear Tape-Open) 5 or later that supports LTFS.

The hierarchical storage management system 100 illustrated in FIG. 1 is further configured to include a management terminal 140. The management terminal 140 is a terminal operated by an administrator of the hierarchical storage management system 100, and accepts instructions for the backup and the restoration of the file system for the hierarchical storage, from the administrator. Alternatively, the management terminal 140 can also accept criteria or schedules for the backup and the restoration, which are negotiated in advance, from the administrator. In this case, the backup or the restoration is automatically started with satisfaction of a predetermined criterion, or with arrival of scheduled timing.

It should be noted that, in the example illustrated in FIG. 1, nodes 112-1 to 112-M are shown to be connected to shared disks 122-1 to 122-N on the shared disk array 120, and the nodes 112-1 to 112-L are shown to be connected to tape drives 132-1 to 132-L, respectively, in the tape library 130. It should, however, be noted that FIG. 1 is exemplary.

For example, the shared disk array 120 can be further divided into one or more pieces of on-line storage (high-speed disks) and one or more pieces of near-line storage (medium-speed disks) in a three-layer (tier) configuration, or flash storage can be added to the shared disk array 120. Moreover, for example, the plurality of tape drives 132 may be configured to be connected to one node 112. Furthermore, for example, the cluster 110 may include a client node connected via a LAN (Local Area Network), and a management node that communicates with the management terminal to principally perform management of the file system.

Figure 2:
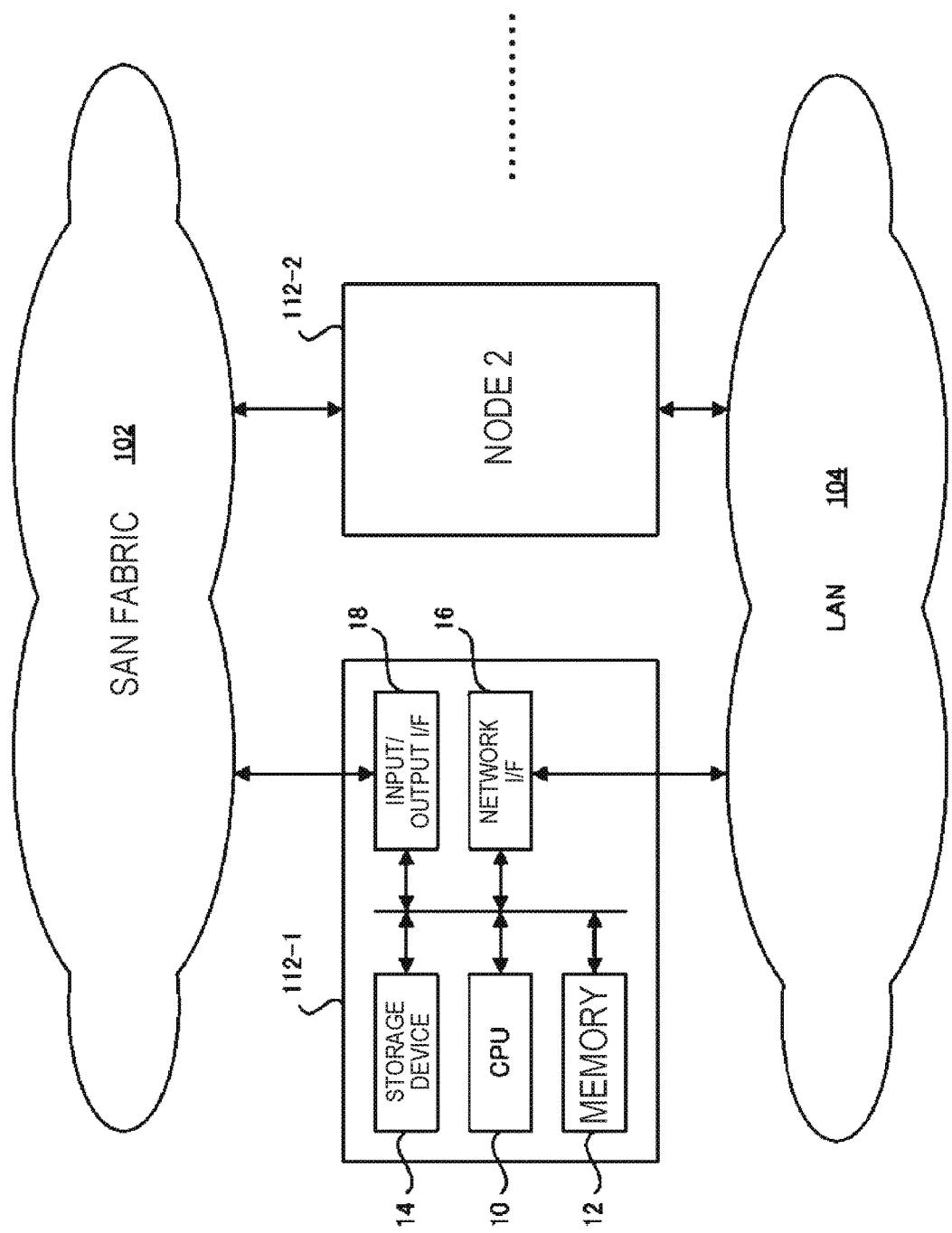
FIG. 2 is a hardware configuration diagram of nodes constituting a cluster in the hierarchical storage management system, in accordance with embodiments of the present invention.

FIG. 2 is a diagram illustrating a hardware configuration of the nodes 112 constituting the cluster 110 in the hierarchical storage management system 100, in accordance with embodiments of the present invention. As illustrated in FIG. 2, each of the nodes 112 is configured to include a single-core or multi-core CPU (Central Processing Unit) 10; a memory 12, such as an SDRAM (Synchronous Dynamic Random Access Memory); a storage device 14, such as a ROM (Read Only Memory), an HDD (Hard Disk Drive), or a flash memory; a network interface 16; and an input/output interface 18.

The network interface 16 is configured as a network adapter, such as an NIC (Network Interface Card), and connects the node 112 to a LAN 104. The input/output interface 18 is configured as a network adapter such as an NIC, an HBA (host bus adapter) such as an FC, or the like, and connects the node 112 to the SAN fabric 102. The nodes 112 may be interconnected via an HCA (host channel adapter), such as InfiniBand®.

The node 112, under the control of the CPU 10, reads out various programs stored in the storage device 14, deploys the programs on the memory 12, and thereby implements functions and processes for which the node 112 is responsible, as described below.

It should be noted that while a hardware configuration of the management terminal 140 is not particularly illustrated, the management terminal 140 similarly includes a CPU, a memory, a storage device, and a network interface, and can be further configured to include user interfaces, such as a display, a keyboard, and a mouse. While hardware configurations of the shared disk array 120 and the tape library 130 are not particularly illustrated either, they can be configured to include a processor, a memory, a ROM, a network interface, an input/output interface, and other appropriate hardware.

Figure 3:
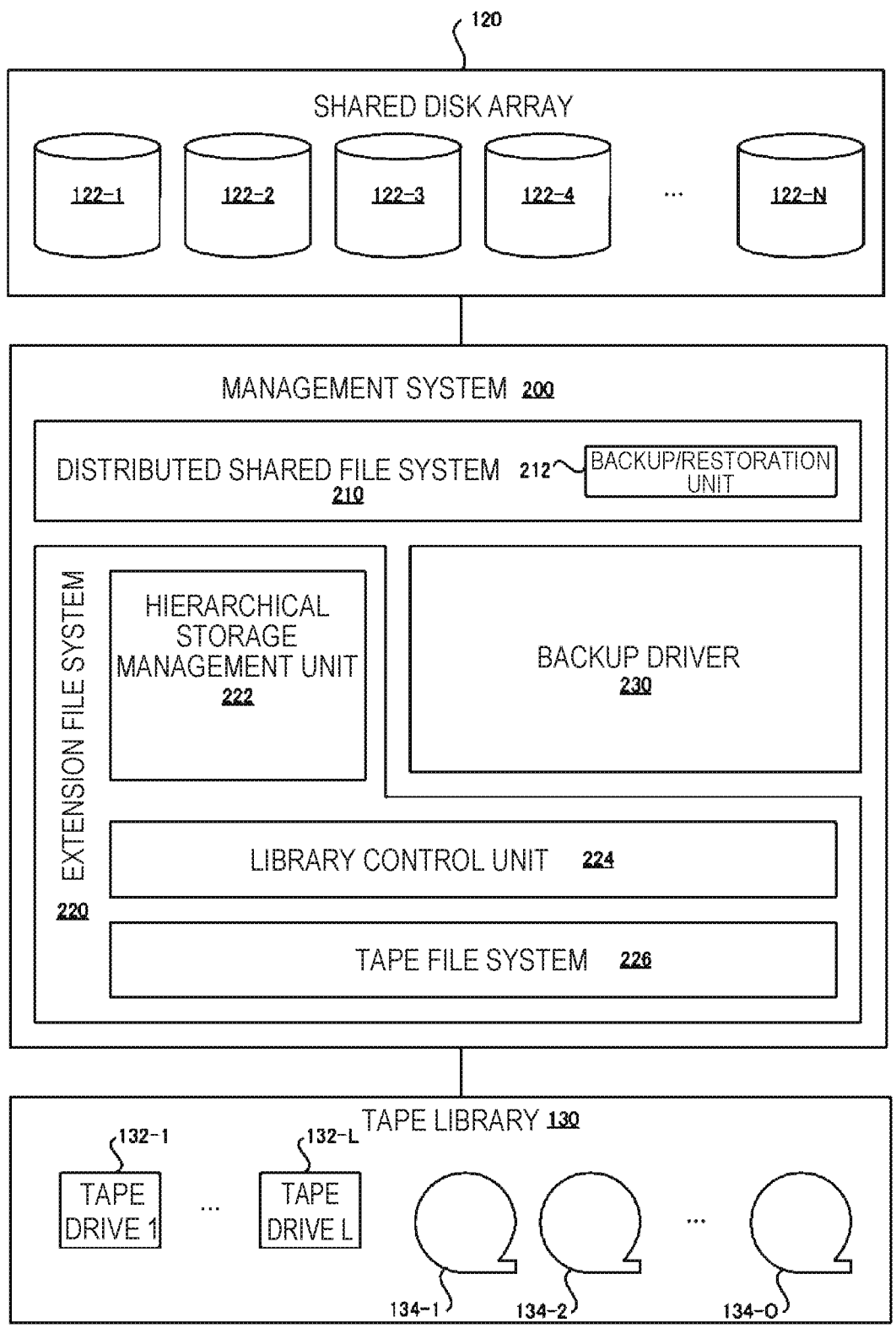
FIG. 3 is a software configuration diagram of the hierarchical storage management system, in accordance with embodiments of the present invention.

FIG. 3 is a software configuration diagram of the hierarchical storage management system 100, in accordance with embodiments of the present invention. A hierarchical storage management system (which hereinafter may simply be referred to as "management system") 200 illustrated in FIG. 3 is configured to include a distributed shared file system 210, an extension file system 220, and a backup driver 230, in a software configuration.

The distributed shared file system 210 is a software component, for example, provided by GPFS®, as described above. The distributed shared file system 210 includes a backup/restoration unit 212 that backs up and restores metadata (which is inode information in the described embodiment) of the file system, as an internal function. The backup/restoration unit 212 is provided as a component responsible for a function referred to as "SOBAR (Scale Out Backup and Restore)," in a particular embodiment using GPFS®.

The extension file system 220 integrates the tape library 130 into the distributed shared file system 210 to provide a software component group for extension. The extension file system 220 is configured to include a hierarchical storage management unit 222, a library control unit 224, and a tape file system 226, as such components.

The hierarchical storage management unit 222 performs control of automatic migration (referred to as "migration") of appropriate files from the distributed shared file system (the shared disks 122) to the tape library 130 (the tape media 134), based on the predetermined policy. The hierarchical storage management unit 222 also performs control of automatic recall (referred to as "recall") of the migrated files from the tape library 130 to the distributed shared file system, when the files are accessed.

The library control unit 224 controls selection of the tape media and the state of resources. The library control unit 224 selects the tape media, schedules and processes requests for the migration and the recall, based on the predetermined policy.

The tape file system 226 enables the tape library 130 to be mounted as one file system on the tape media 134. The tape media 134 within the tape library 130 are typically accessed as subdirectories within the tape library. The tape file system 226 runs on the nodes connected to the tape drives that become the migration destinations, and accesses recording areas on the tape media 134 via a file system interface of LTFS. It should be noted that, in the described embodiment, while the tape library is described as being mounted as one file system on the tape media 134, an aspect may be employed in which a single tape drive is mounted as one file system on a tape medium, without the configuration of the tape library.

In the particular embodiment using GPFS®, the extension file system 220 is provided by a software package referred to as "LTFS EE." In that case, the hierarchical storage management unit 222, the library control unit 224, and the tape file system 226 are referred to as "Hierarchical Storage Manager (HSM)," "Multi-Tape Management Module (MMM)," and "LTFS LE (Liner Tape File System Library Edition)+," respectively.

Integration of the extension file system 220 (or the tape file system 226) for the tape library 130, into the distributed shared file system 210 illustrated in FIG. 3 constitutes the file system for managing the hierarchical storage in the present embodiment. This integration enables file space management, such as automatic migration of files to tapes, and calling the files from the tapes when the files are accessed, in a file system having one name space in which disks and the tapes are integrated.

The backup driver 230 controls backup and restoration of this integrated file system. The backup driver 230 accepts a backup request and a restoration request from the administrator, and then executes a backup process and a restoration process for the integrated file system. The backup driver 230 will be described in detail below.

It should be noted that the components illustrated in FIG. 3 show the software configuration as the management system 100 including the cluster 110 and the management terminal 140, and are typically implemented in a manner distributed on one or more computers constituting the management system 100. Corresponding software components will operate in cooperation with each other on each computer such as the node 112.

Hereinafter, prior to detailed description of the backup process and the restoration process for the file system for the hierarchical storage according to embodiments of the present invention, a file management structure within the above described file system will be outlined first, and also, problems in performance of the backup process and the restoration process will be described with reference to FIG. 4.

Figure 4:
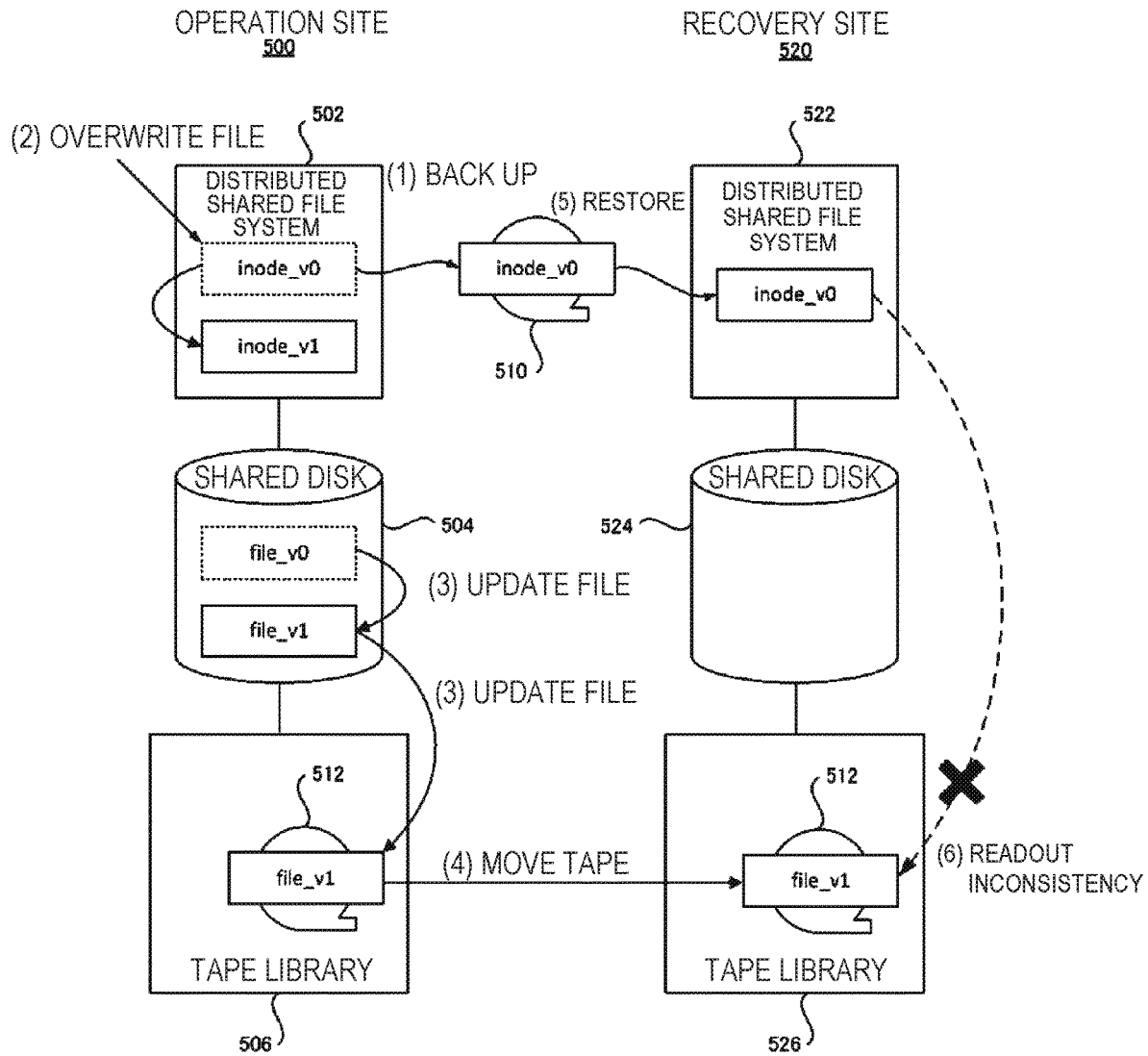
FIG. 4 is a diagram describing problems in performance of a backup process and a restoration process in a file system as recognized by embodiments of the present invention.

FIG. 4 is a diagram describing problems in performance of a backup process and a restoration process in a file system as recognized by embodiments of the present invention. FIG. 4 illustrates systems similar to that illustrated in FIG. 1, including an operation-side system as an operation site 500 and a recovery-side system as a recovery site 520. The operation site 500 and the recovery site 520 include distributed shared file systems 502, 522 operating on the clusters, shared disks 504, 524, and tape libraries 506, 526, respectively, in substantially the same configuration.

On the distributed shared file system 502, a state where a file (including a directory) on the shared disk 504 accessible from the node on the cluster is replicated on a tape medium 512 in the tape library 506, so that data exists on both the disk and the tape, is referred to as "pre-migrated state." As time has elapsed, for a file that is no longer required to be read out immediately, file body data is deleted from the shared disk 504 and exists only on the tape medium 512, while metadata (inode information) including attribute information on the file is left on the distributed shared file system 502. This state where the file body data exists only on the tape is referred to as "fully-migrated state."

In addition to basic file attribute information, such as size and time of day information, medium identification information (tape ID) identifying the tape where the file body data exists has been saved in the metadata (the inode information) of the file. This medium identification information enables the file to be read out from the tape medium 512, in response to a request for access to the file. GPFS® includes a function of backing up only this inode information, via the above described function referred to as "SOBAR."

If the metadata (the inode information) is backed up on a medium 510 in order to replicate the distributed shared file system 502 of the operation site 500, the tape medium 512 in the tape library 506 of the operation site 500, and the medium 510 are first moved to the recovery site 520. On the recovery site 520, the metadata (the inode information) of each file is then restored from the medium 510, and the state of each file is put into the fully-migrated state. In this way, the file system can be replicated without access to file data on the tape.

However, after (1) the backup of the metadata (inode_v0) is performed on the operation site 500, when (2) the file is updated, (3) the file on the shared disk 504 is updated (the file becomes file_v1), and also such change is reflected in the file on the tape medium 512 (the file becomes file_v1). Accordingly, subsequently, even if (4) the medium 510 and the tape medium 512 are moved to the recovery site 520, and also (5) the backed up metadata is restored, inconsistency is caused. More specifically, the metadata (inode_v0) at a time point of the taking of the backup is restored, while the change after the taking of the backup has been reflected in the file on the tape (the file becomes file_v1). Consequently, (6) even if the file is attempted to be read out from the tape medium 512 based on the restored metadata (inode_v0), the readout may not be performed due to the change in the tape ID or the deletion of the file.

In order to avoid such inconsistency, it is conceivable to write-inhibit the tape that has stored the backup, after the backup of the metadata. The write inhibition enables recovery of the file system with consistency, but is applied to the tape with a remaining unused portion, and thus prevents efficient use of the capacity of the tape. Moreover, it is also conceivable to perform reclamation for putting the data on the tape into another tape tightly to rewrite the data, in order to improve usage efficiency of the tape. The rewrite, however, takes time and puts a load on the system.

Accordingly, the hierarchical storage management system 100 according to embodiments of the present invention utilizes the backed up metadata of the distributed shared file system, and a format of the tape medium, to allow the recovery of the file system for the hierarchical storage, with the efficient use of the tape capacity, without the time taken for the rewrite of the data, and without the load put on the system. Specifically, characteristics of a format of the file system are utilized in which each of the tape media 134 includes an index part, and a data part which is separated from the index part and on which updated information is appended and kept.

With reference to FIGS. 5 to 11, the backup process and the restoration process in the hierarchical storage management system 100, in accordance with embodiments of the present invention will be described in more detail below.

Figure 5:
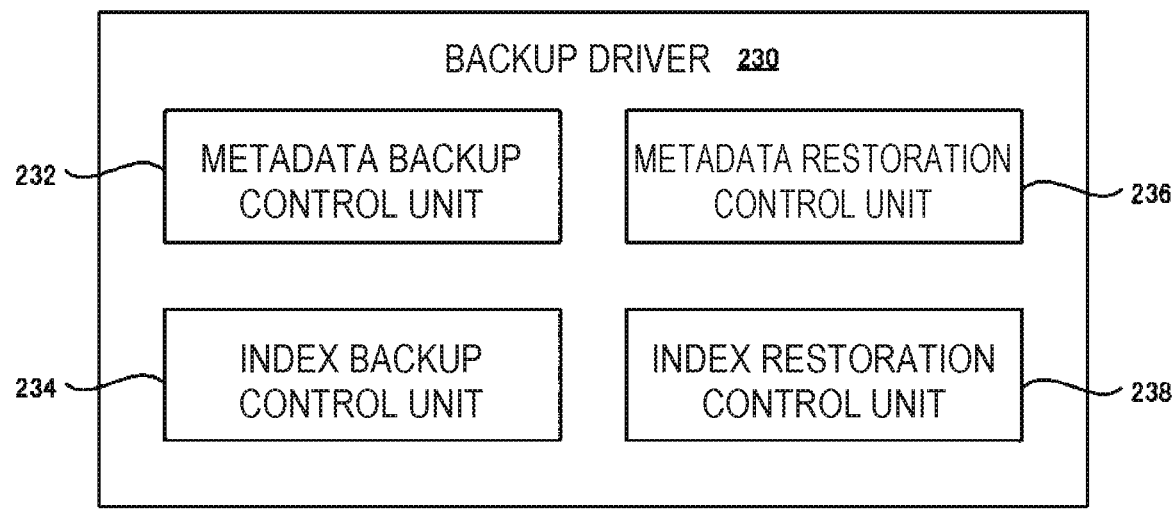
FIG. 5 is a detailed functional block diagram of a backup driver 230 that is responsible for a backup process and a restoration process for a file system for hierarchical storage, in accordance with embodiments of the present invention.

FIG. 5 is a detailed functional block diagram of the backup driver 230 that is responsible for the backup process and the restoration process for the file system for the hierarchical storage, in accordance with embodiments of the present invention. As illustrated in FIG. 5, the backup driver 230 includes a metadata backup control unit 232, an index backup control unit 234, a metadata restoration control unit 236, and an index restoration control unit 238.

The backup driver 230 illustrated in FIG. 5 is implemented on the nodes 112 constituting the cluster 110, another management node connected to the cluster 110 via the LAN 104 or the like, or the management terminal 140. The backup driver 230, for example, receives the backup request or the restoration request based on the operation of the management terminal 140 by the administrator, which, however, is not particularly limited thereto, and starts the backup process or the restoration process. Alternatively, the backup driver 230 can sense that a criterion set by the administrator in advance has been satisfied, or sense that timing scheduled by the administrator in advance has arrived, and start the backup process or the restoration process.

The metadata backup control unit 232 controls metadata of a plurality of files that have already been migrated within the distributed shared file system 210, to be backed up at a time point of the backup request. A metadata backup function, for example, is provided by the backup/restoration unit 212 in the distributed shared file system 210. In this case, the metadata backup control unit 232 can call the backup/restoration unit 212 in the distributed shared file system 210, in response to the backup request from the administrator.

The index backup control unit 234 controls an index file of each of the one or more tape media 134 to which the above plurality of files have been migrated, to be backed up substantially at the same time point as the above described metadata. An index of each of the tape media 134 has been stored on a predetermined managed storage area on the shared disk array 120 in this management system 100. The index backup control unit 234 replicates each index at a backup time point which has been stored on the shared disk array 120, to generate backup data of the index.

It should be noted that the files to be backed up are presupposed to be in a management state of having been pre-migrated or fully migrated to the tape library 130. In other words, files managed in the pre-migrated or fully-migrated state become backup targets. Alternatively, files desired to be the backup targets are required to have been put in at least the pre-migrated state, in advance.

Moreover, backup destination media for the metadata and the index are not particularly limited, and any storage media may be used, such as magnetic media, such as tape media and hard disks; optical media, such as CDs (Compact Discs), DVDs, and Blu-ray®; magneto-optical media, such as MOs (Magneto-Optical disks); and semiconductor storage media, such as flash memories, and SSDs (Solid State Drives).

The metadata restoration control unit 236 controls the metadata of the plurality of files within the distributed shared file system 210 to be restored from data on the backup destination media. A metadata restoration function, for example, is provided by the backup/restoration unit 212 in the distributed shared file system 210. In this case, the metadata restoration control unit 236 can call the backup/restoration unit 212 in the distributed shared file system 210, based on the restoration request from the administrator. The metadata restoration control unit 236 further controls the plurality of files involved in the restoration, to be set into a state of having been fully migrated to the tape media 134.

The index restoration control unit 238 controls the index of each of the one or more tape media 134 to be restored from the data on the backup destination media, which has been backed up substantially at the same time point as the above metadata. The index is managed on the predetermined managed storage area on the shared disk array 120 in the management system 100. The index restoration control unit 238 replicates the backup of each index within the backup destination media, on the managed storage area on the shared disk array 120. Alternatively, if the backup destination media are provided to be incorporable in the shared disk array 120, the backup of each index within the backup destination media may be used as the index on the managed storage area, through such incorporation, without the replication.

Figure 6:
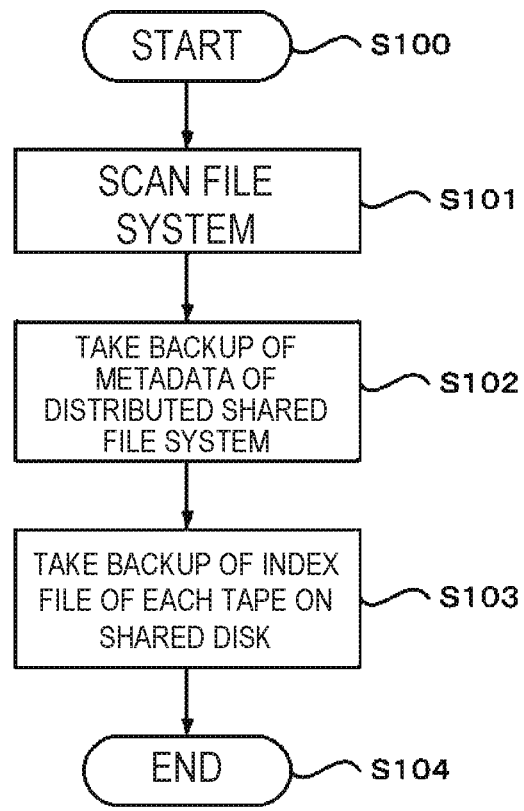
FIG. 6 is a flowchart illustrating a backup method for the file system for the hierarchical storage, in accordance with embodiments of the present invention.
Figure 7:
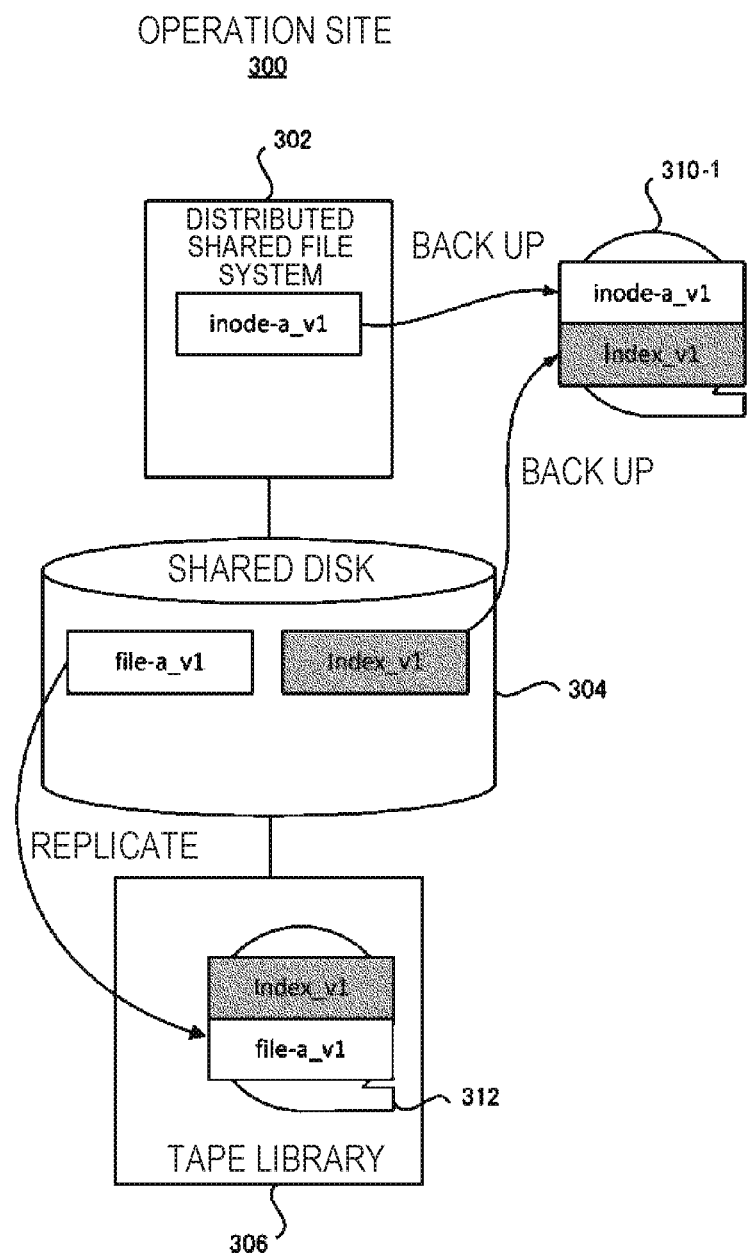
FIG. 7 is a diagram describing the backup process for the file system for the hierarchical storage, in accordance with embodiments of the present invention.

FIG. 6 is a flowchart illustrating a backup method for the file system for the hierarchical storage, in accordance with embodiments of the present invention. FIG. 7 is a diagram describing the backup process for the file system for the hierarchical storage, in accordance with embodiments of the present invention.

FIG. 7 illustrates the operation-side system as an operation site 300. The operation site 300 includes a distributed shared file system 302, a shared disk 304, and a tape library 306. If one file (file-a_v1) is put into the fully-migrated state or the pre-migrated state, a tape ID for identifying a tape medium 312 that is a migration destination is saved in metadata (inode-a_v1). The tape medium 312 in the LTFS format is partitioned into an index partition (hereinafter referred to as "IP") and a data partition (hereinafter referred to as "DP"), and an index (Index_v1) exists on the IP of the tape medium 312. Moreover, in the described embodiment, the index (Index_v1) also exists on the shared disk 304. Information about which block on the DP of the tape medium 312 the above file (file-a_v1) body data has been saved in has been written in the index (Index_v1). The backup process illustrated in FIG. 6 is assumed to have been called in such a state.

The process illustrated in FIG. 6 is started from operation S100, in response to the backup request from the administrator. In operation S101, the backup driver 230 scans the distributed shared file system 302. At a time point of arrival of the backup request, a file that has already been migrated to the pre-migrated state or the fully-migrated state becomes the backup target. A snapshot of the file system is first taken to determine a target file. Files of the snapshot are then scanned to determine a backup target file. In an example illustrated in FIG. 7, for example, the file (file-a_v1) becomes the target. Moreover, the tape medium 312 to which the file (file-a_v1) has been migrated is also extracted as the target.

In operation S102, the backup driver 230 performs a backup of metadata (inode image) of the distributed shared file system 302. While FIG. 7 illustrates only the metadata (inode-a_v1) of one file, the backup/restoration unit 212 can perform image backup including collectively compressed metadata of a plurality of files within the distributed shared file system 302.

In operation S103, the backup driver 230 performs a backup of the index of each tape medium 312, which exists on the shared disk 304, substantially at the same time point as the metadata of the distributed shared file system 302. While FIG. 7 illustrates only the index (Index_v1) of one tape medium 312, if the migration has been performed across a plurality of tape media, the latest one index on the shared disk 304 is backed up for each one of all the tape media that have become the migration destinations.

The flow illustrated in FIG. 6 ends in operation S104. The metadata (inode-a_v1) and the index (Index_v1) are backed up on a medium 310-1. It should be noted that the backup process may be scheduled to be performed at a frequency as required, such as once a day. After the backup of the metadata and the index, operation of the file system for the hierarchical storage is resumed.

Figure 8:
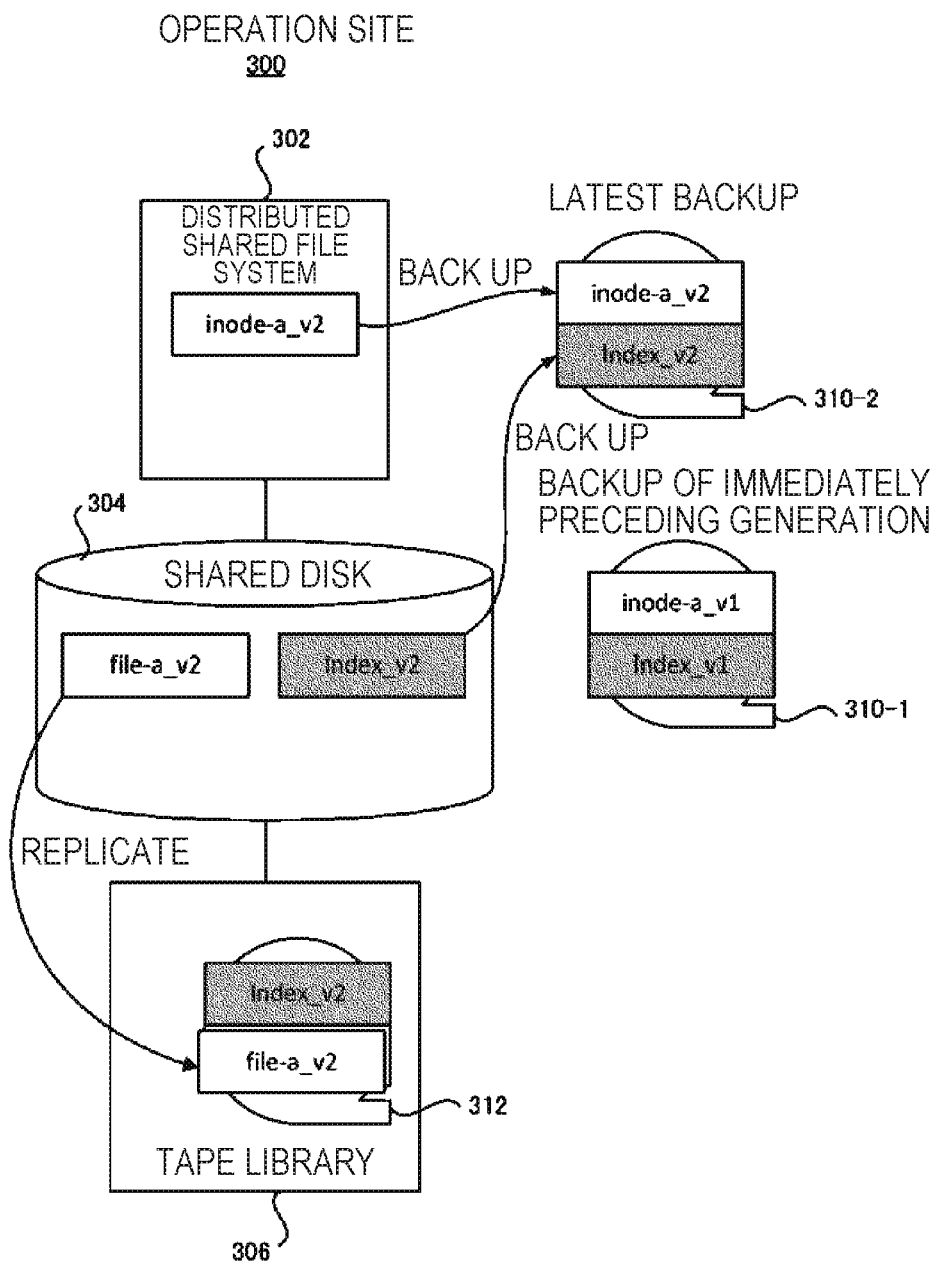
FIG. 8 is a diagram describing a state where operation has been subsequently resumed after the backup process for the file system for the hierarchical storage, in accordance with embodiments of the present invention.

FIG. 8 is a diagram describing a state where the operation has been subsequently resumed after the backup process for the file system for the hierarchical storage, in accordance with embodiments of the present invention. On the operation site 300, if the file is subsequently updated (to be file-a_v2 on the shared disk 304), the updated file is migrated (file-a_v2 is written on the tape medium 312), and the metadata is also updated (to be inode-a_v2). In the updated metadata (inode-a_v2), the tape ID in its extension attribute is updated, if necessary.

Moreover, location information on the newly written file (file-a_v2) on the tape is rewritten with a new index (Index_v2) on both the tape medium 312 and the shared disk 304. If there is no longer any unused portion on the tape medium 312, the file data is written on another tape medium, and in the metadata (inode-a_v2), a new tape ID is overwritten in its extension attribute. In this state, if the backup process is performed again, the metadata (inode-a_v2) and the index (Index_v2) are backed up on a medium 310-2.

Figure 9:
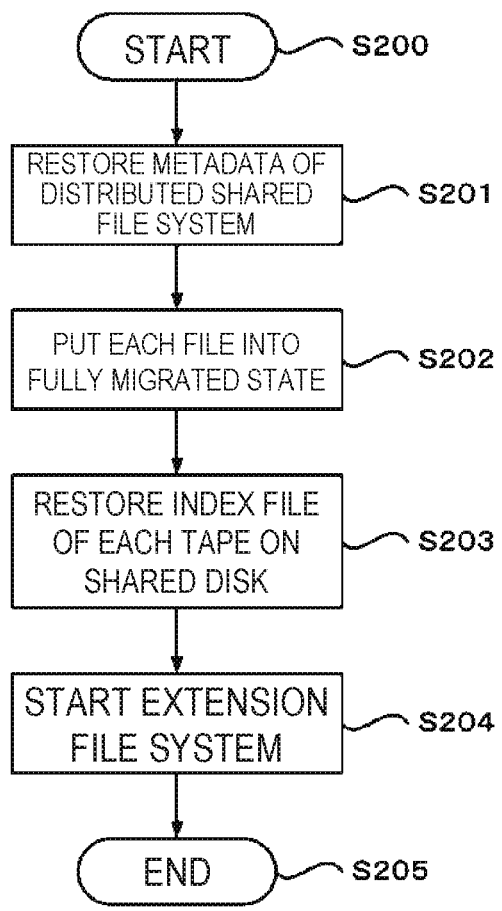
FIG. 9 is a flowchart illustrating a restoration method for the file system for the hierarchical storage, in accordance with embodiments of the present invention.
Figure 10:
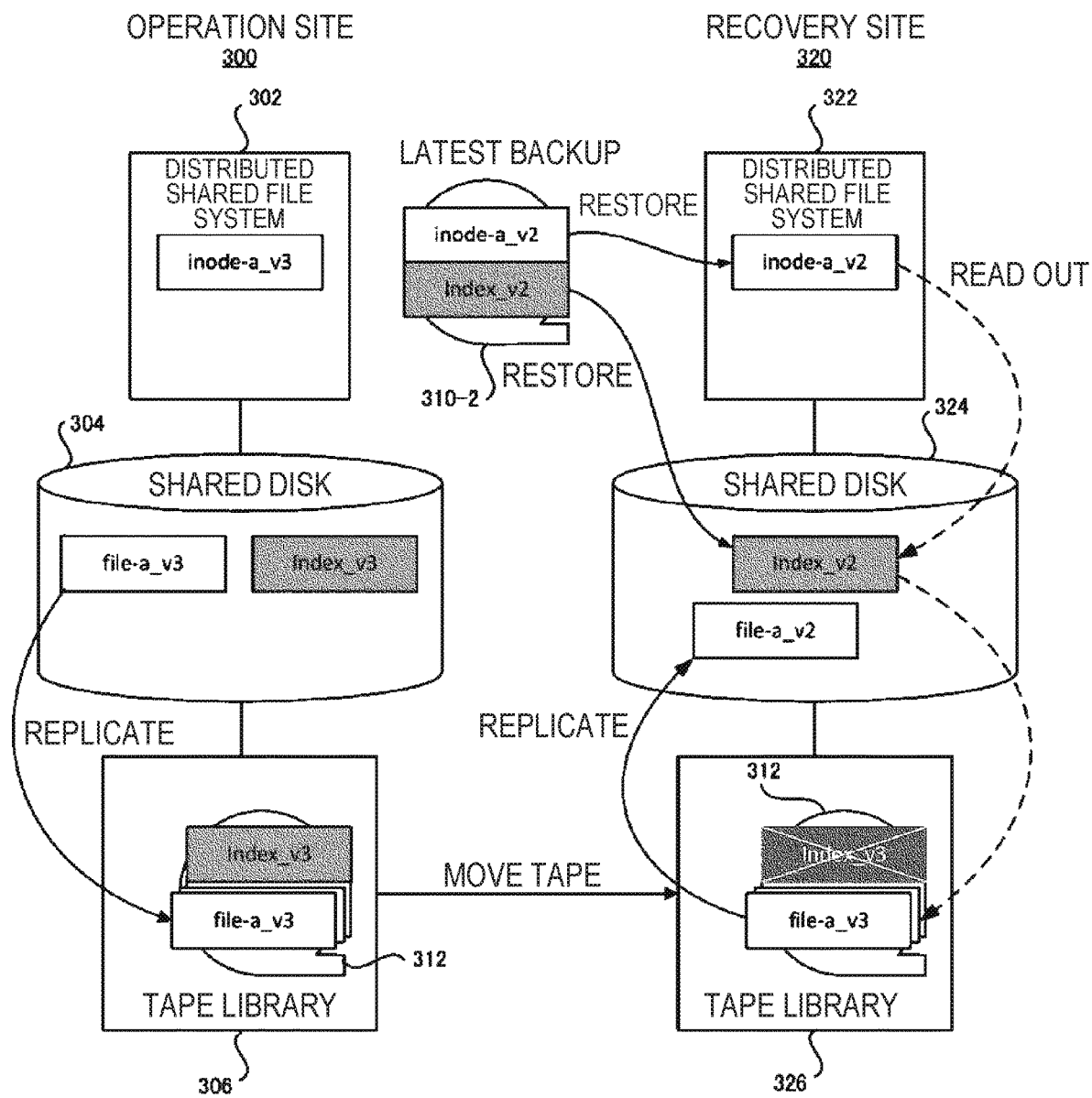
FIG. 10 is a diagram describing the restoration process for the file system for the hierarchical storage, in accordance with embodiments of the present invention.

FIG. 9 is a flowchart illustrating a restoration method for the file system for the hierarchical storage, in accordance with embodiments of the present invention. FIG. 10 is a diagram describing the restoration process for the file system for the hierarchical storage, in accordance with embodiments of the present invention.

FIG. 10 illustrates the recovery-side system as a recovery site 320, in addition to the operation site 300. The recovery site 320 has a configuration similar to the operation site 300, and includes a distributed shared file system 322, a shared disk 324, and a tape library 326. In order to restore the file system on the recovery site 320, three items, that is, (1) the tape medium 312, (2) the metadata (the inode image) at a time point of desired recovery, and (3) the index backed up substantially at the same time as the metadata, are moved from the operation site 300 to the recovery site 320. It should be noted that, in FIG. 10, the file (file-a) has been further updated after the latest backup has been performed as illustrated in FIG. 8. Accordingly, the tape medium 312 to be moved includes the updated file (file-a_v3) and an updated index (Index_v3).

The process illustrated in FIG. 9 is started from operation S200, in response to the restoration request from the administrator. In operation S201, the backup driver 230 restores metadata (inode information) of the distributed shared file system 322 from the backup on the backup destination medium 310-2. While FIG. 10 illustrates only the metadata (inode-a_v2) of one file, the backup/restoration unit 212 collectively restores the metadata of the plurality of files.

In operation S202, the backup driver 230 changes the state into the fully-migrated state, in the metadata of each restored file. For example, even if the state has been in the pre-migrated state at the backup time point, the shared disk 324 at an upper level is empty immediately after the restoration, and the file body data exists only on the tape medium 312. Operation S202 is thus for the purpose of having consistency with this state.

In operation S203, the backup driver 230 restores the index to a managed area for each tape medium on the shared disk 324, from the backup within the backup destination medium 310-2, which has been performed substantially at the same time point as the metadata. While FIG. 10 illustrates only the index (Index_v2) of one tape medium 312, if there are a plurality of tape media, one backed up index is replicated on the shared disk 324, for each one of all the tapes. In operation S204, the extension file system 220 is started, and this process ends in operation S205.

The recovery is completed here, so that necessary files can be read out.

In an example illustrated in FIG. 10, since the file has been further updated after the latest backup has been performed, the index on the tape medium 312 has been updated (to be Index_v3), and also, the updated file (file-a_v3) has been appended on the DP of the tape medium 312. Accordingly, the index (Index_v2) restored on the shared disk 324 does not match the index (Index_v3) on the IP of the tape medium 312.

Accordingly, the hierarchical storage management system 100 according to the present embodiment is configured to, at the time of the first mounting of the tape medium after the restoration, ignore the index file (Index_v3) on the IP of the tape medium, and perform the mounting with the restored index (Index_v2) on the shared disk 324. Location information on the file body data (file-a_v2) at the backup time point of the file (file-a) on the DP exists in the restored index (Index_v2). Moreover, since the latest file (file-a_v3) is written so as to be appended on the DP of the tape medium 312, the file (file-a_v2) at the backup time point also exists thereon. Accordingly, the file (file-a_v2) at the backup time point can be accessed with the restored index (Index_v2).

Figure 11:
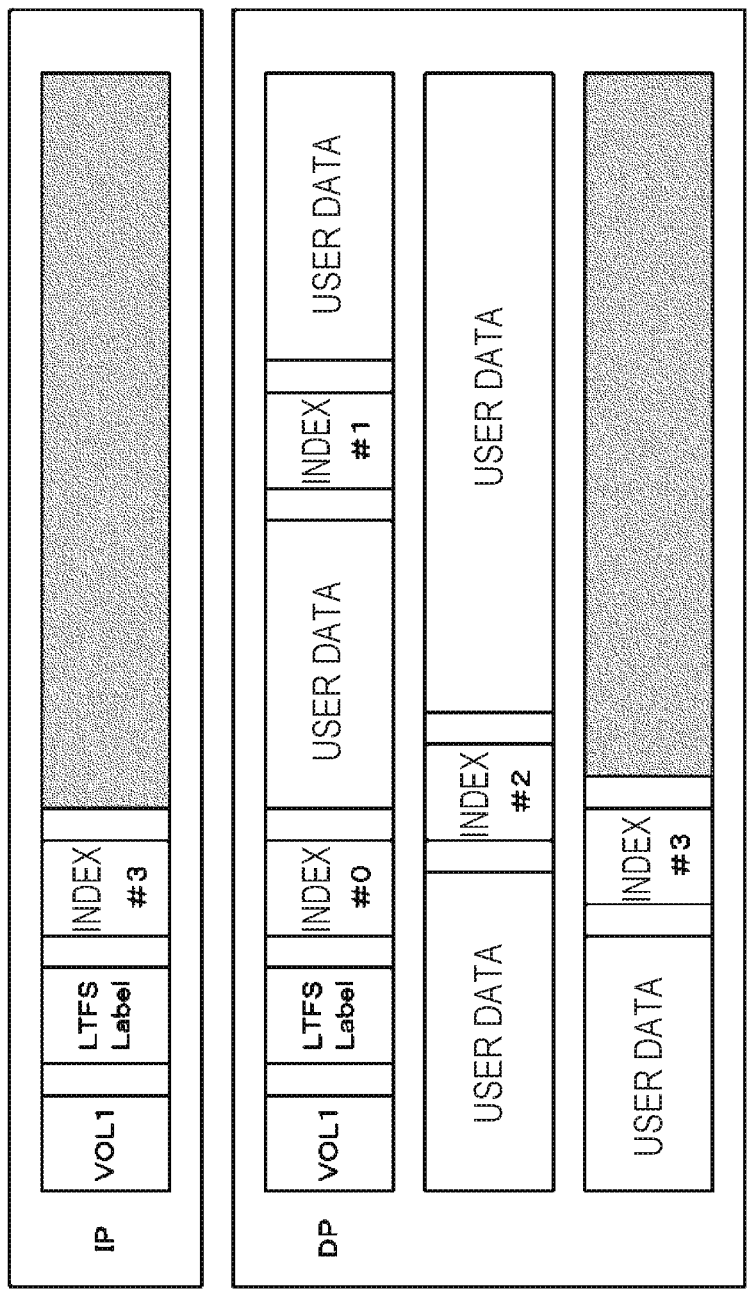
FIG. 11 is a schematic diagram of a format of a tape medium that can be used in the hierarchical storage management system, in accordance with embodiments of the present invention.

FIG. 11 is a diagram schematically illustrating the format of the tape medium that can be used in the hierarchical storage management system, in accordance with embodiments of the present invention. As illustrated in FIG. 11, in the LTFS format, the file data (user data) is saved on the DP of the tape medium. A block number (location information) within the DP in which the data has been written is written to the index file on the IP of the tape medium. Accordingly, the index file can be used to specify the block in which the file data has been written, so that the file can be read out.

If the file has been updated, the file is appended on the DP of the tape medium (which may also be a tape medium different from the previous one without unused capacity or the like) that is the migration destination of the file, and also, in the index of the tape medium that is the migration destination, old location information on the file is erased, and new location information is written to replace the index file on the IP with the latest one. If a new file has been added, the file is appended on the DP of the tape medium that becomes the migration destination, and also, in its index, the location information is written to replace the index file on the IP with the latest one. If the file has been deleted, in the index of the tape medium that has been the migration destination, the old location information on the file is erased, and the index file on the IP is replaced with the latest one. If a rollback function is enabled, the index file has also been saved on the DP, the previous index on the DP is not erased and is left, and the latest index is appended at the end of the data.

It should be noted that, in the above described embodiment, the index of the tape medium on the shared disk has been described as being replicated on the backup destination medium. In other embodiments, however, if the rollback function is enabled, the index of the tape medium that is the file migration destination is also appended on the DP at each time point. Accordingly, specification information for specifying the index, such as the block number on the DP in which the index at the backup time point has been written, and a generation number of the index, may be stored on the backup destination medium, instead of an index body of the tape medium. In that case, however, the index on the DP needs to be read out for the restoration of the index. In this view, preferably, an embodiment in which the index is replicated can be said to be preferred.

Figure 12:
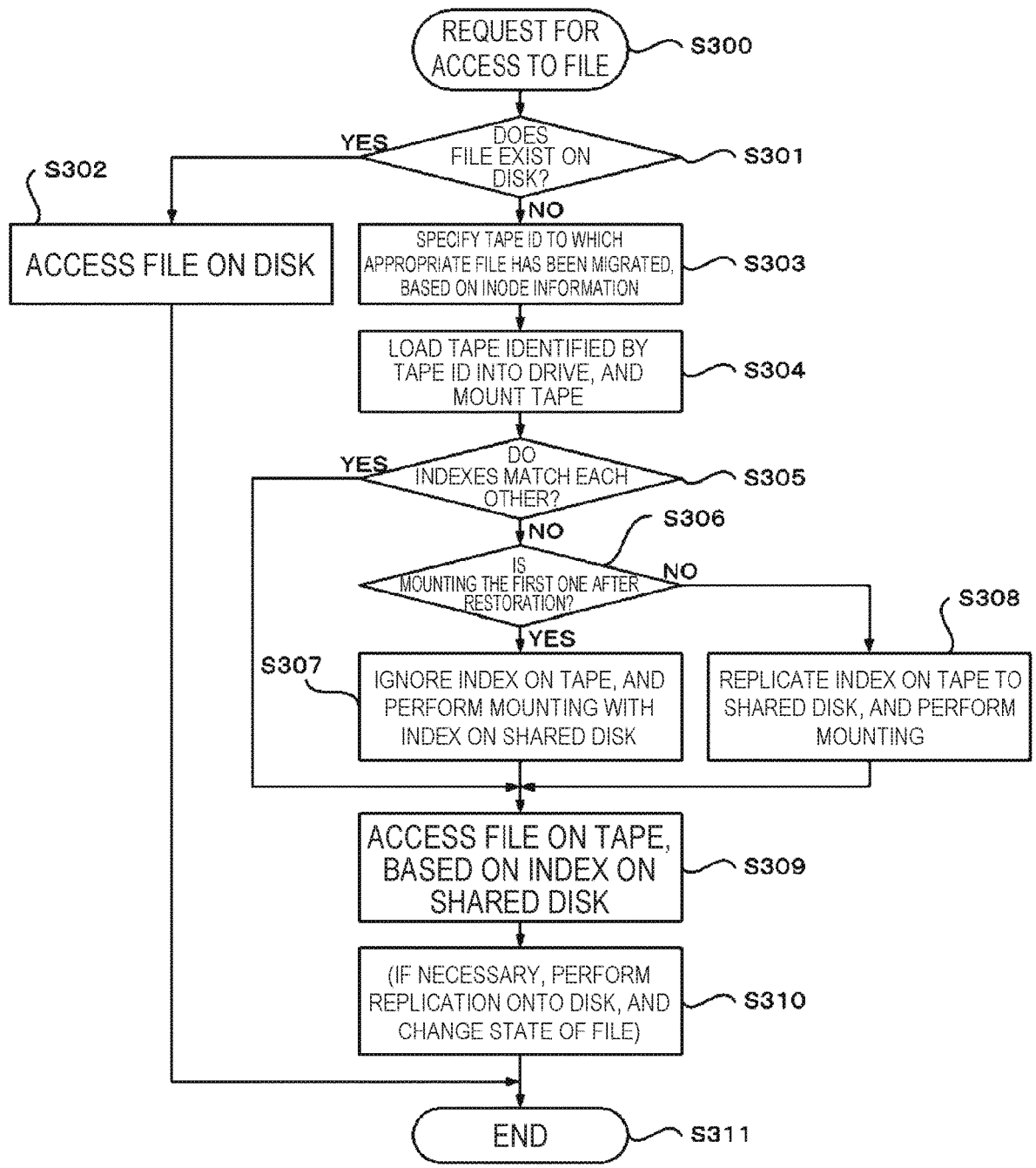
FIG. 12 is a flowchart illustrating a file access method after restoration in the file system for the hierarchical storage, in accordance with embodiments of the present invention.
Figure 13:
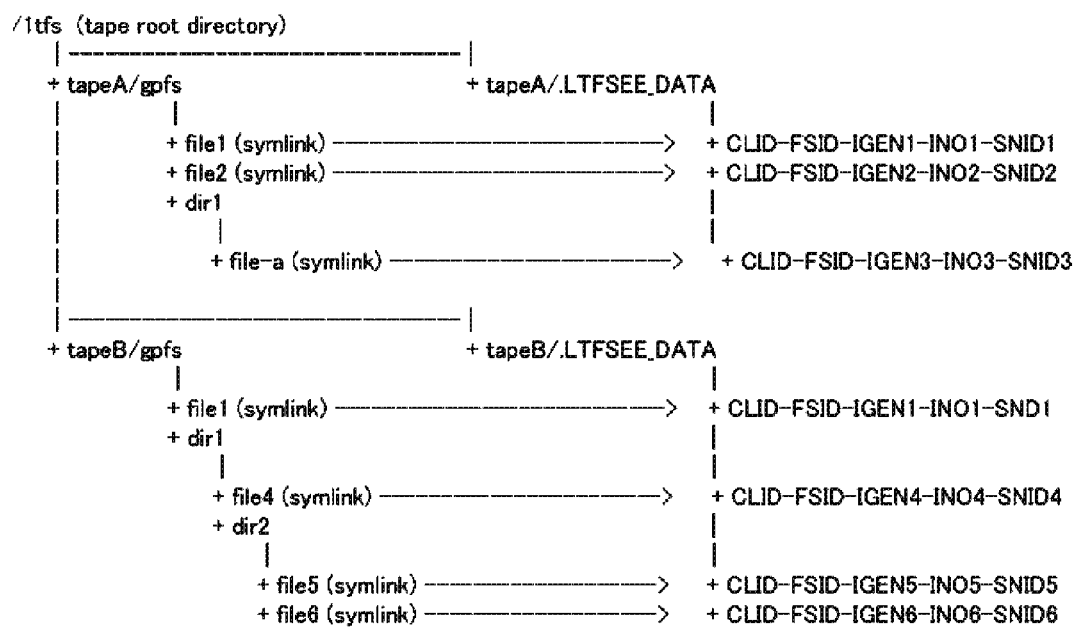
FIG. 13 is a diagram describing the file access method in the file system for the hierarchical storage, in accordance with embodiments of the present invention.

With reference to FIGS. 12 and 13, file access after the restoration will be described below. FIG. 12 is a flowchart illustrating a file access method after the restoration in the file system for the hierarchical storage, in accordance with embodiments of the present invention. FIG. 13 is a diagram describing the file access method in the file system for the hierarchical storage, in accordance with embodiments of the present invention.

Here, a case of using LTFS EE will be described as an example. In this case, the file data to be migrated within the tape media has a unique identifier (UID) including a cluster ID, a file system ID, an inode generation, and an inode number, as a file name, and is linked to a path on the distributed shared file system. When the file is updated, the UID is changed, and the link is re-created. Moreover, the tape IDs for identifying the tape media to which the file data has been migrated are saved as the attribute information within the inode, and they can be used to read out the files.

Files on the distributed shared file system are recognized under a directory "/gpfs" as illustrated in the upper section of FIG. 13. In contrast, in a file system of the tape library, subdirectories having the tape IDs are created under a directory "/ltfs" as illustrated in the lower section of FIG. 13, and under the subdirectory for each individual tape ID, files on the tape medium are recognized in directory hierarchy.

The process illustrated in FIG. 12 is started from operation S300, in response to a request for access to a file. Here, it is assumed that a user has accessed a file (for example, "/gpfs/dir1/file-a") on the distributed shared file system. In operation S301, the node 112 that has accepted the access request first determines whether the file exists on the shared disk. In operation S301, if the file is determined to exist on the shared disk (YES), the node 112 accesses the file on the shared disk in operation S302, and ends this process in operation S311.

In contrast, in operation S301, if the file is determined not to exist on the shared disk (NO), the node 112 specifies the tape ID to which an appropriate file has been migrated, based on the inode information on the file, in operation S303. The tape ID (for example, "tapeA") of the tape medium, on which actual data has been written, has been written in a file extension attribute in the inode information. In operation S304, the tape medium identified by the tape ID is loaded into the tape drive, and mounted.

In operation S305, the node 112 determines whether the index on the IP of the tape medium to be mounted matches the corresponding index on the shared disk. In the example illustrated in FIG. 10, since the file has been updated after the backup of second-generation metadata (inode_v2), a third-generation index (Index_v3) exists on the IP of the tape medium. In contrast, a second-generation index (Index_v2) exists on the shared disk, and thus a mismatch occurs. In operation S305, if the indexes are determined to mismatch each other (NO), the process branches to operation S306.

In operation S306, the node 112 determines whether the above mounting is the first mounting after the restoration. A flag is prepared to be set at the time of the first mounting for a predetermined tape medium, for example, and it is possible to check whether the flag is set, and determine whether the mounting is the first one. In operation S306, if the mounting is determined to be the first one (YES), the process branches to operation S307.

In operation S307, the node 112 ignores the index on the IP of the tape medium, performs the mounting with the index on the shared disk, and advances the process to operation S309. In the example illustrated in FIG. 10, the third-generation index (Index_v3) on the tape medium is ignored, and the second-generation index (Index_v2) on the shared disk is used.

In contrast, in operation S306, if the mounting is determined not to be the first one (NO), the process branches to operation S308. In operation S308, the node 112 replicates the index on the tape medium to the shared disk, performs the mounting, and advances the process to operation S309. It should be noted that if the indexes are determined to match each other (YES) in operation S305, the process is advanced directly to operation S309.

In operation S309, the node 112 accesses a file ("/ltfs/tapeA/dir1/file-a") on the specified tape medium, based on the index on the shared disk. This file is actually a symbolic link, and the readout is performed from a file in a folder "tapeA/.LTFSEE_DATA" where the file body data exists.

In the example illustrated in FIG. 10, since the file has been updated after the backup of the second-generation metadata (inode_v2), information on the file data (file-a_v3) written after the backup has been saved in the index (Index_v3) on the tape medium. This index, however, is ignored at the time of the first mounting, and the second-generation index (Index_v2), which has been restored on the shared disk and used for the mounting, is used. Since the information on the file (file-a_v2) has been saved in the second-generation index (Index_v2), the file body data "file-a_v2" at the backup time point is read out.

In operation S310, if necessary, the file body data involved in the access is recalled onto the disk, the state of the file is changed, and this process ends in operation S311. In the case of readout access, for example, the state is changed into the pre-migrated state for existence both on the disk and the tape. In the case of overwrite access, for example, the state is changed into a resident state for existence only on the disk. It should be noted that, at the time of writing to the mounted tape medium, or at the time of unmounting the mounted tape medium, the index on the IP of the tape medium is overwritten with the latest index after the restoration, and the mismatch between the disk and the tape is thus resolved at that timing.

Hereinafter, with reference to FIGS. 14 and 15, and to FIG. 11 again, the backup method and the restoration method according to embodiments of the present invention will be compared to other envisioned methods.

(Comparison to the Case with Write Inhibition)

Figure 14:
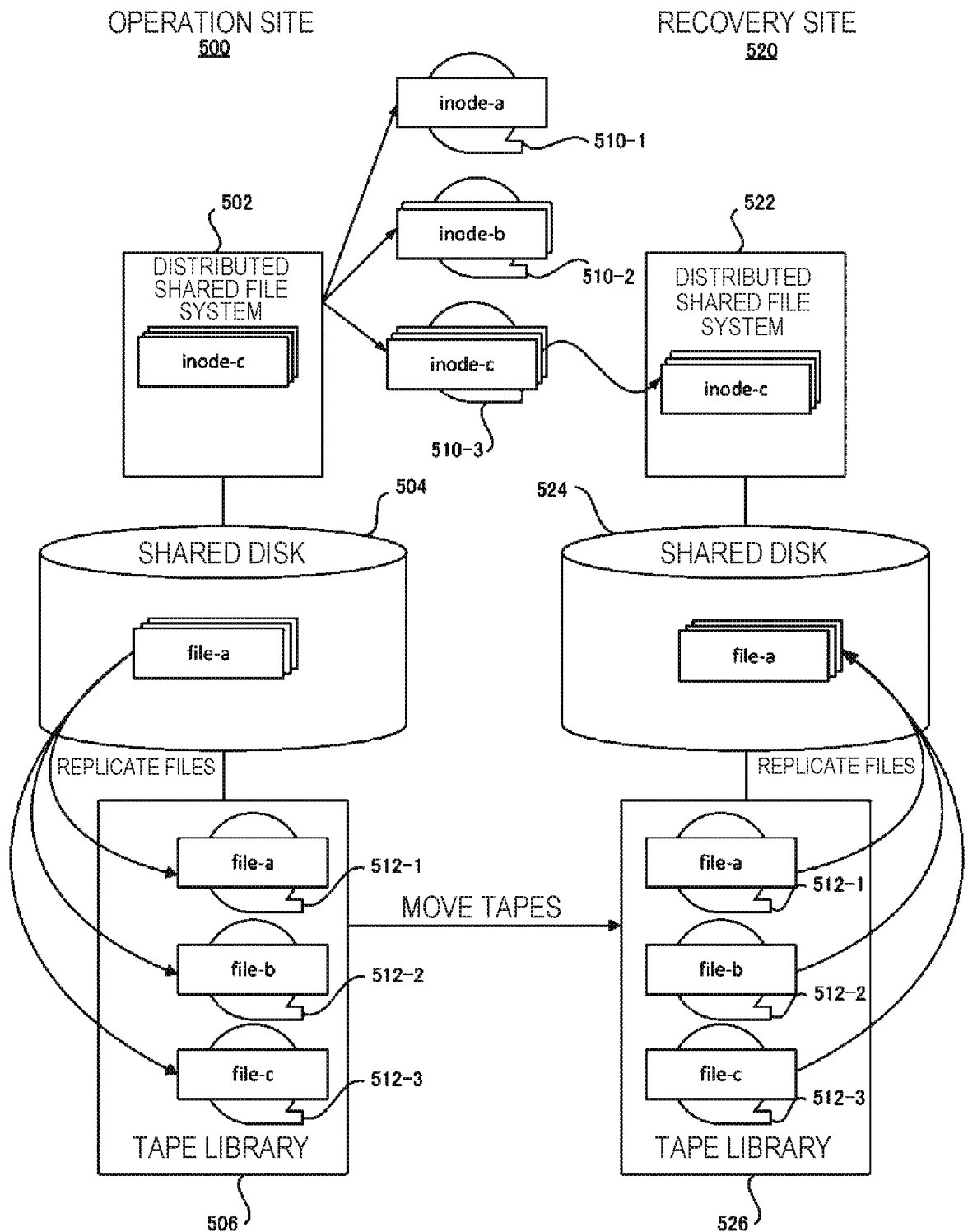
FIG. 14 is a diagram describing another backup method and another restoration method with write inhibition, in accordance with an embodiment of the present invention.

FIG. 14 is a diagram describing another backup method and another restoration method with write inhibition. In order to avoid the inconsistency between the backed up and restored metadata and the file on the tape medium, as described with reference to FIG. 4, a conceivable approach is to write-inhibit the tape media that have already been written, each time the backup is performed.

Successive creation of three different files "file-a," "file-b," and "file-c" will be considered as in FIG. 14, for example. For each creation, each file is migrated to each tape medium, each backup of metadata "inode-a," "inode-a/b," and "inode-a/b/c" is performed, and the tape on which each of the files "file-a," "file-b," and "file-c" has been saved is write-inhibited. This results in three write-inhibited tape media. Moreover, for recovery, a medium 510-3 that retains the last backup is used to restore the metadata "inode-a/b/c." Moreover, all the three tape media, which have been write-inhibited for each backup, are moved to the recovery site 520.

In order to retrieve the latest information as much as possible, it is necessary to perform the backups of the metadata of the distributed shared file system at an appropriate frequency, and write-inhibit the tape media each time. If the backups are frequently performed, however, tapes still having unused portions will be write-inhibited, which leads to an increase in unavailable capacity of the tapes. Moreover, a large-scale file system introduces a large number of tape drives within a tape library to simultaneously write a plurality of files into a plurality of tape media in a distributed manner, in order to accelerate migration. Specifically, in such a case, each write-inhibition of the tape media makes the tapes, which have left the unused portions, of the same number as the tape drives, and thus severely decreases the usage efficiency of the tapes.

A calculation is provided for a system using a tape library including 10 tape drives, by way of example. In order to increase speed of writing at a time, it is assumed that all the tape drives are used to perform simultaneous saving into 10 tape media in a distributed manner. While the percentage of usage of the tape capacity varies, 50% of the tape capacity is assumed to be used on average. Moreover, it is assumed that 50% of the capacity of each of the 10 tape media is used per day, and that the backups of the metadata are performed every day. If the LTO6 format is used, the tape capacity is 6.25 TB in a compressed state. Accordingly, the above described method with the write inhibition uses only 50% of the 10 tape media, and thus leaves approximately 31 TB unused per day. If the backups are performed every day, it results in a loss of approximately 218 TB of the capacity, which is 50% of the total capacity, per week.

In contrast, in the backup method and the restoration method according to the embodiment of the present invention, if a similar condition is assumed, 40 tape media are used, in which 30 tape media are put in a state where they have run out of the capacity without any unused portion, through continuation of the appending to the tape media for a week. While only 50% of 10 tape media are used on the last day, the unused portions of the tapes after a week are suppressed to approximately 31 TB, which is 13% of the total capacity. Even if 90% of the capacity of each tape is used every day, there is a loss of 10% in the approach with the write inhibition, while the loss is reduced to the extent of 1%, which is approximately within ¹/₁₀, in an approach according to the embodiment of the present invention.

(Comparison to the Case with Reclamation)

Figure 15:
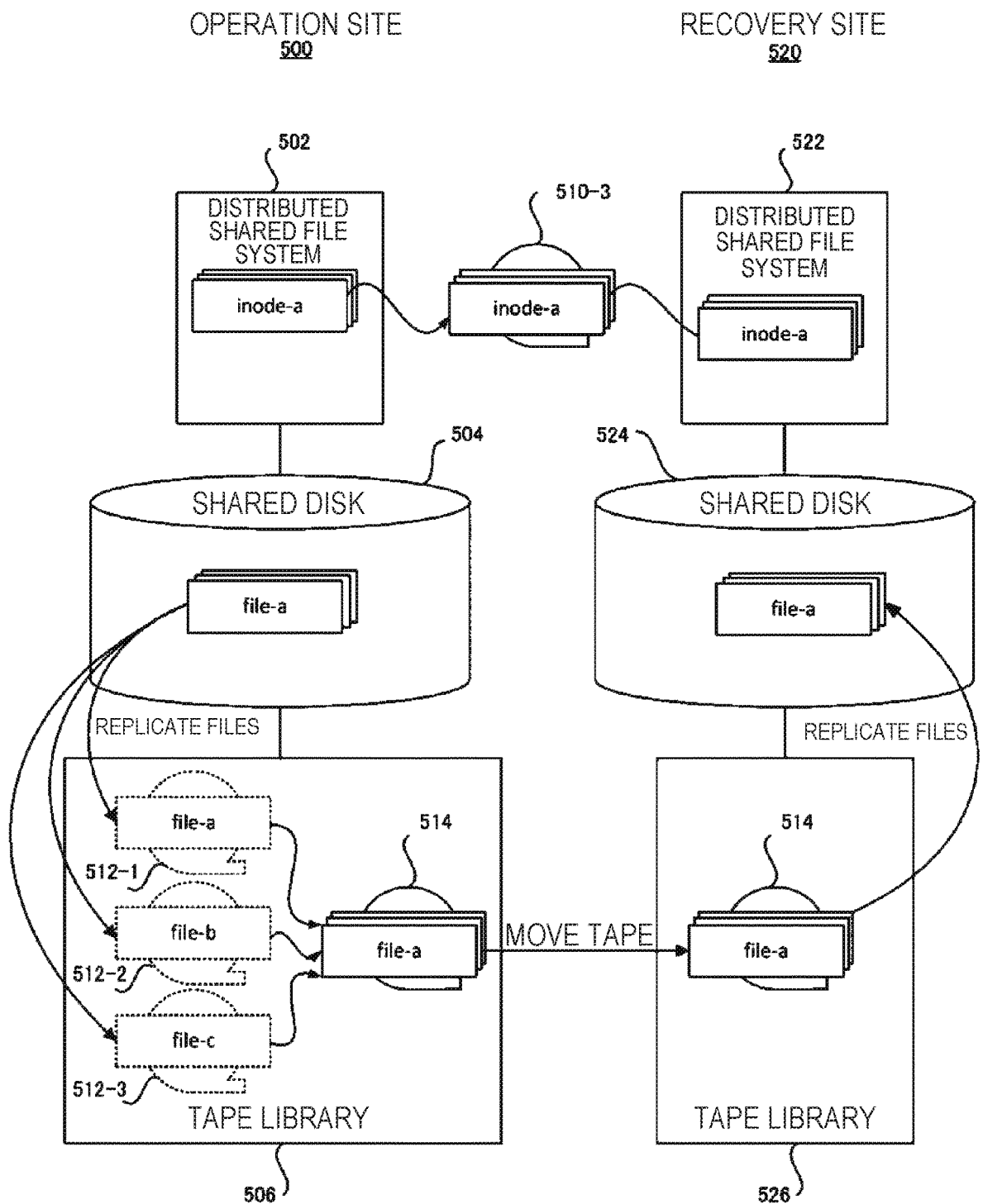
FIG. 15 is a diagram describing another backup method and another restoration method with the write inhibition and reclamation, in accordance with an embodiment of the present invention.

FIG. 15 is a diagram describing another backup method and another restoration method with the write inhibition and the reclamation. As illustrated in FIG. 15, for the above described unused portions of the tapes, the files (file-a/b/c), which have been saved once into a plurality of tape media 512-1 to 512-3 in a distributed manner, are rewritten onto one tape medium 514 through the reclamation, before the backups of the metadata are performed. The rate of utilization of the tape capacity can thus be improved.

Data movement in the reclamation, however, causes reading and writing to the tapes, and puts a load on the system through occupation of the tape drives and data transactions, in the case of a large number of files. Moreover, if previous file data is desired to be read out for a reason of an erroneously erased file or the like, a function referred to as "rollback function" described below can be utilized for going back to past file states and reading out the previous file data. However, even if there are the backups of the metadata before file deletion, since the tape ID differs between the metadata and an actual tape due to performance of the reclamation, the previous file data cannot be read out.

If the reclamation is performed for the tapes each having 50% of the capacity used in the above described system having the 10 tape drives, at most 50% of data will be moved to another tape. Since time for writing to one tape is approximately 4.4 hours at the fastest speed in the case of the LTO6 format, even if the 10 tape drives are used, the tape drives are occupied for 2.2 hours to reclaim 10 tapes. During a reclaim process, performance degradation occurs, such as inability to immediately read out the files migrated to the tape.

In contrast, the backup method and the restoration method according to embodiments of the present invention only require the backups of the metadata and the index. Here, in order to estimate backup time, sizes of the metadata and the index to be backed up are first calculated. In this estimation, the number of files to be stored on one tape medium is assumed to be approximately 50000. This value has been approximated from 6.25 TB, which is the capacity in the compressed state in LTO6, on the assumption of the average file size of approximately 100 MB, and also in consideration of usage for the index. The number of tapes is assumed in the case where 50% of the capacity of each of the 10 tapes has been continuously used per day for a week as described above. In other words, the number of tapes is assumed to be approximately 35.

The size of an inode image backup for the number of files "50000" is calculated according to the following expression (Expression 1) since the inode size of one file is 512B (bytes), and is estimated to be approximately 896 MB. While the size is actually compressed to be smaller than this size, the above value is calculated as the maximum value.

Image backup size (B)=512B×(the number of files/tape)×(the number of tapes) (Expression 1)

Extent information, which retains information on fragmented file data resulting from one file being written in a distributed manner within one tape, exists in an LTFS index. An offset within the file, the block number of the data on the tape, the number of bytes, and the like have been saved in the extent information. The size of the index per tape medium can be roughly estimated according to the following expression (Expression 2), with errors in the number of digits of time and the like, which are saved parameters.

Index size (B) of one tape=1350B+the number of files×(1211B+file path length (B)+the number of extents×165B)+the number of directories×(directory path length (B)+400B) (Expression 2)

Here, the minimum sizes of the index and the extent are 1350B and 165B, respectively. In LTFS, the file path length and the directory path length are defined as 512B or less.

While the size of the index varies with a difference in the number of extents depending on a form of writing data blocks (the degree of distribution), or a difference in the length of the file name, the same tape capacity, the same average file size, the same number of files per tape, and the same number of tapes as those described above are assumed here, and it is further assumed that the number of extents per file is 10, the average value of the file path length is 256B, and the average value of the directory path length is 126B. According to the above expression (Expression 2), the size of the index per tape is then estimated to be approximately 156 MB, and the size for 35 tapes is estimated to be approximately 5.46 GB.

If the backup destination media are the tape media, each of writing time and readout time requires only on the order of 14 seconds. Even if 1000 tape media are recovered, they are estimated to be replicable in 6.5 minutes. In other words, it is possible to say that a restoration approach according to embodiments of the present invention can save the readout time in comparison to an approach with the reclamation.

Moreover, with the use of the reclamation, since the files are moved to another tape, and index history is erased to empty the original tape, the rollback function as described below for recovering erased data with the use of an old index cannot be used. The backup method and the restoration method according to the embodiment of the present invention can also go back to the past, and recover an old file system.

(Comparison to the Case with Rollback)

As described with reference to FIG. 11, the rollback for utilizing the index written on the DP to retrieve past file data is enabled for the data written in the LTFS format.

The rollback requires mounting of the tape medium and readout in reverse order from the latest index, in order to search for the index of a generation to be rolled back on the DP. In an example illustrated in FIG. 11, if a file in a state prior to certain time T is to be read out, a third-generation index #3 is first read out, and if the index #3 has been written at time T or later, the block number of an index #2 on the DP on the tape, which has been written in the index #3, is read out, and a readout position is moved to a location where the index #2 has been written. The index #2 is read out, and comparison is repeated until an index prior to time T is found.

In this way, while the rollback function can also designate the old index to read out the file, several tens of minutes to several hours are required for one tape, and the recovery takes a long time with an increase in the number of files or tapes. It is possible to say that the restoration method according to embodiments of the present invention can save the readout time also in comparison to an approach with the rollback.

(Comparison to Other Methods)

In addition to the above description, periodic full backups of all the metadata (the inode information) and the file data enable restoration of past states. In the case of a large amount of data, however, a large amount of tapes for the backup, and many resources used in the backup, such as disk caches, are required.

As described above, according to the embodiment of the present invention, it is possible to provide a backup method, a restoration method, a storage system, and a program, which can achieve shortened recovery time, an operational file system even after the backup, a small load on the system, and increased usage efficiency of the storage media that become the migration destinations.

In the backup method according to the embodiment of the present invention, on the operation site, the file data is saved on the tape medium, and the metadata and the index are backed up. In the restoration method according to the embodiment of the present invention, on the recovery site, the metadata is restored, also the index, which has been backed up at the same time as the metadata, is restored, and this index is used to read out the file data on the tape at the same time point as the metadata. A time-consistent file system can thereby be recovered.

Unused areas of the tapes can be decreased to ¼ or less than those in an approach with inhibition of updates to the tape media, and the efficient use of the tape capacity is enabled. Moreover, the backup and the restoration required for the recovery of the file system can be performed in a short time, without any system load for the occupation of the tape drives for rewriting the tape media through the reclamation for several hours, and the like.

Some embodiments provide a program product for causing a management computer to function, the management computer being for managing backup of a file system, the file system managing hierarchical storage including one or more storage media, each of the one or more storage media including a data part which is separated from an index and on which updated information is appended and kept, the file system managing each of a plurality of pieces of data within the file system to be migrated to at least any of the one or more storage media, the program product being for causing the management computer to function as: means for controlling metadata of the plurality of pieces of data migrated within the file system to be backed up; and means for controlling the index of each of the one or more storage media to which the plurality of pieces of data have been migrated, to be backed up substantially at the same time point as the metadata, wherein backed up data of the metadata and the index is used in restoration along with the one or more storage media.

Some embodiments provide a program product for causing a management computer to function, the management computer being for managing restoration of a file system, the file system managing hierarchical storage including one or more storage media, each of the one or more storage media including a data part which is separated from an index and on which updated information is appended and kept, the program product being for causing the management computer to function as: means for controlling metadata of a plurality of pieces of data within the file system to be restored from backed up data, and controlling, in the metadata, the plurality of pieces of data to be set into a state of having been fully migrated to at least any of the one or more storage media; and means for controlling the index of each of the one or more storage media to be restored from data backed up substantially at the same time point as the metadata, wherein the one or more storage media are storage media on which backups of the metadata and the index have been taken.

The above functions of embodiments of the present invention can be achieved by device-executable programs described in legacy programming languages, object-oriented programming languages or the like, such as assembler, C, C++, C #, and Java®, and can be stored and distributed in device-readable recording media, or transmitted for distribution.

While embodiments of the present invention have been described above with the particular embodiment, the present invention is not limited to the embodiment, and can be modified within a scope conceivable by those skilled in the art, through other embodiments, additions, modifications, deletions and the like, which are included within the scope of embodiments of the present invention, as long as the operation and effect of embodiments of the present invention are provided in any aspect.

The term(s) "Smalltalk" and the like may be subject to trademark rights in various jurisdictions throughout the world and are used here only in reference to the products or services properly denominated by the marks to the extent that such trademark rights may exist.

The term "exemplary" means of or relating to an example and should not be construed to indicate that any particular embodiment is preferred relative to any other embodiment.

What is claimed is:

1. A method for backup, the method comprising:
backing up metadata of a plurality of pieces of migrated data within a file system for managing hierarchical storage to a first storage medium of one or more storage media on a computer system;
migrating each of the plurality of pieces of migrated data to a second storage medium that includes a data part which is separated from an index, and wherein updated information is appended to and kept on the second storage medium; and
backing up the index of the second storage medium to the first storage medium substantially at the same time point as backing up the metadata,
wherein the index of the second storage medium includes location information for all files stored on the second storage medium, the location information including block numbers for each of the plurality of pieces of migrated data,
wherein a copy of the index is stored on the data part of the second storage medium, and
wherein backup data of the metadata and the index is used in restoration along with the one or more storage media.

2. The method of claim 1, further comprising:
resuming operation of the file system for the hierarchical storage subsequent to backing up the metadata and the index.

3. The method of claim 1,
wherein the index of the second storage medium is stored on a managed storage area of the hierarchical storage, and
wherein backing up the index includes generating backup data of the index by replicating each index at a backup time point which has been stored on the managed storage area.

4. The method of claim 1,
wherein the index of the second storage medium is appended on the data part included in the second storage medium;
wherein backing up the index includes generating backup data of the index by storing specification information for specifying each index at a backup time point which has been appended on the data part.

5. The method of claim 1, further comprising:
in response to data within the file system being added or modified, appending the added or modified data on a data part of a storage medium that is a migration destination of the added or modified data and writing location information of the added or modified data on the data part to an index of the storage medium that is the migration destination of the added or modified data; and
in response to data within the file system being deleted, erasing the location information of the deleted data from the index of the data part of the storage medium being the migration destination of the data.

6. The method of claim 1,
wherein the second storage medium includes one or more tapes, and
wherein the hierarchical storage includes one or more pieces of on-line storage, one or more pieces of near-line storage, or a combination thereof, at an upper level of the one or more tapes.

7. The method of claim 1,
wherein the metadata of the file system includes medium identification information for identifying the second storage medium as attribute information; and
wherein the index of the second storage medium includes location information of the migrated data on the data part as attribute information.

8. The method of claim 1, wherein the method further comprises:
performing a restoration operation for at least one of the one or more storage media using the backed up index and metadata;
mounting a particular storage medium of the one or more storage media on which the backups have been performed;
determining whether the particular storage medium is a first storage media medium mounted after a restoration;
if the particular storage medium is determined to be the first storage medium mounted, configuring the index existing on the particular storage medium to be ignored, and configuring a restored index to be used; and
at a time of writing to the mounted storage medium or a time of unmounting the mounted storage medium, overwriting an index part included in the particular storage medium with a latest index after the restoration.

9. A system comprising:
two or more storage media, each of the two or more storage media including a data part which is separated from an index; and
a processor communicatively coupled to the two or more storage media, the processor being configured to perform a method comprising:
migrating, to a second storage medium of the two or more storage media, a file within a file system for managing hierarchical storage, wherein the file includes a plurality of pieces of data, and wherein updated information is appended to and kept on the second storage medium;
backing up metadata of the plurality of pieces of data to a first storage medium of the one or more storage media;
backing up the index of the second storage medium to the first storage medium substantially at the same time point as backing up the metadata,
wherein the index of the second storage medium includes location information for all files stored on the second storage medium, the location information including block numbers for each of the plurality of pieces of data,
wherein a copy of the index is stored on the data part of the second storage medium, and
wherein backup data of the metadata and the index is used in restoration along with the one or more storage media.

10. The system of claim 9, wherein the metadata includes inode information associated with one or more files stored on the file system, wherein the one or more files include the plurality of pieces of data, wherein the inode information includes attribute information for the one or more files, the attribute information including size information and a tape ID for the one or more files, and wherein the tape ID for each respective file identifies a tape that includes file body data for the respective file.

11. The system of claim 9,
wherein the index of the second storage medium is stored on a managed storage area of the hierarchical storage, and
wherein backing up the index includes generating backup data of the index by replicating each index at a backup time point which has been stored on the managed storage area.

12. The system of claim 9,
wherein the index of the second storage medium is appended on a data part included in the second storage medium, and
wherein backing up the index includes generating backup data of the index by storing specification information for specifying each index at a backup time point which has been appended on the data part.

13. The system of claim 9, wherein the method performed by the processor further comprises:
in response to data within the file system being added or modified, appending the added or modified data on a data part of a storage medium that is a migration destination of the added or modified data and writing location information of the added or modified data on the data part to an index of the storage medium that is the migration destination of the added or modified data; and
in response to data within the file system being deleted, erasing the location information of the deleted data from the index of the data part of the storage medium being the migration destination of the data.

14. A computer program product comprising one or more non-transitory computer readable storage media having program instructions embodied therewith, the program instructions executable by a processor to cause the processor to perform a method comprising:
backing up metadata associated with a migrated file from a distributed shared file system to a first storage medium of a computer system, wherein the migrated file is stored on a second storage medium that includes a data partition which is separated from an index partition that includes an index of the second storage medium, wherein the index includes location information for files stored on the second storage medium, and wherein updated information is appended to and kept on the second storage medium; and
backing up the index of the second storage medium to the first storage medium, wherein backing up the index of the second storage medium is performed at substantially the same time as backing up the metadata associated with the migrated file.

15. The computer program product of claim 14, wherein the second storage medium is a tape medium, wherein the location information includes block numbers where the data of the files are saved, and wherein backup data of the metadata and the index is used in restoration along with the tape medium.

16. The computer program product of claim 15, wherein the method further comprises:
migrating the file from a shared drive in the distributed shared file system to the tape medium, wherein a copy of the index is stored on the shared drive and on the data partition of the second storage medium, and wherein backing up the index to the first storage medium includes transmitting the index from the shared drive to the first storage medium.

17. The computer program product of claim 16, wherein the index of the second storage medium includes location information for at least one file other than the migrated file.

18. The computer program product of claim 15, wherein the method further comprises:
determining that the migrated file has been updated on a shared drive in the distributed shared file system;
migrating the updated file to the tape medium as a new file; and
updating the metadata associated with the updated file.

19. The computer program product of claim 18, wherein the method further comprises:
generating a new index for the new file;
rewriting location information for the new file on the tape medium and on the shared drive using the new index.

20. The computer program product of claim 18, wherein the method further comprises:
determining that there is no unused portion on the tape medium;
responsive to determining that there is no unused portion on the tape medium, writing the new file on a second tape medium; and
storing a new tape ID for the second tape medium in an extension attribute of the metadata of the migrated file, wherein the new tape ID replaces an original tape ID associated with the tape medium.

* * * * *